(12) United States Patent
Wanakule et al.

(10) Patent No.: US 11,524,919 B2
(45) Date of Patent: Dec. 13, 2022

(54) GLAZING COMPRISING A FUNCTIONAL COATING AND A COLOR ADJUSTMENT COATING

(71) Applicant: SAINT-GOBAIN GLASS FRANCE, Courbevoie (FR)

(72) Inventors: Nisita Wanakule, Paris (FR); Cyril Jean, Paris (FR); Paul Jacquet, Pantin (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 17/283,851

(22) PCT Filed: Oct. 17, 2019

(86) PCT No.: PCT/FR2019/052461
§ 371 (c)(1),
(2) Date: Apr. 8, 2021

(87) PCT Pub. No.: WO2020/079373
PCT Pub. Date: Apr. 23, 2020

(65) Prior Publication Data
US 2021/0340061 A1 Nov. 4, 2021

(30) Foreign Application Priority Data
Oct. 18, 2018 (FR) ...................................... 1859652

(51) Int. Cl.
*B32B 15/04* (2006.01)
*B32B 17/06* (2006.01)
*C03C 17/36* (2006.01)
*B32B 17/10* (2006.01)
*C03C 17/06* (2006.01)
*C03C 17/22* (2006.01)

(52) U.S. Cl.
CPC ........ *C03C 17/366* (2013.01); *B32B 17/1022* (2013.01); *B32B 17/1055* (2013.01); *B32B 17/10055* (2013.01); *B32B 17/10201* (2013.01); *B32B 17/10449* (2013.01); *C03C 17/06* (2013.01); *C03C 17/22* (2013.01); *C03C 17/3626* (2013.01); *C03C 17/3644* (2013.01); *B32B 2250/03* (2013.01); *B32B 2255/205* (2013.01); *B32B 2307/204* (2013.01); *B32B 2307/416* (2013.01); *B32B 2551/00* (2013.01); *C03C 2217/212* (2013.01); *C03C 2217/213* (2013.01); *C03C 2217/22* (2013.01); *C03C 2217/256* (2013.01); *C03C 2217/281* (2013.01)

(58) Field of Classification Search
CPC ............ C03C 17/366; B32B 17/10201; B32B 17/10055
USPC ................................. 428/426, 428, 432, 434
See application file for complete search history.

(56) References Cited

U.S. PATENT DOCUMENTS

| | | | |
|---|---|---|---|
| 9,650,290 B2 * | 5/2017 | Vikor | C03C 17/3435 |
| 2011/0240009 A1 | 10/2011 | Haskins et al. | |
| 2013/0089684 A1 * | 4/2013 | Pesce | E04B 1/78 |
| | | | 428/428 |
| 2013/0149473 A1 * | 6/2013 | Frank | C03C 17/36 |
| | | | 29/458 |
| 2013/0337200 A1 * | 12/2013 | Noethe | E06B 3/6715 |
| | | | 428/34 |
| 2015/0301423 A1 * | 10/2015 | Orillard | B32B 17/10201 |
| | | | 359/275 |
| 2018/0297890 A1 * | 10/2018 | Ding | E06B 3/6715 |
| 2018/0307111 A1 * | 10/2018 | Le Houx | B32B 17/10055 |

FOREIGN PATENT DOCUMENTS

| | | |
|---|---|---|
| FR | 2 858 816 A1 | 2/2005 |
| WO | WO 2011/161205 A1 | 12/2011 |

OTHER PUBLICATIONS

International Search Report as issued in International Patent Application No. PCT/FR2019/052461, dated Dec. 20, 2019.

* cited by examiner

*Primary Examiner* — Lauren R Colgan
(74) *Attorney, Agent, or Firm* — Pillsbury Winthrop Shaw Pittman LLP

(57) ABSTRACT

A material includes one or more transparent substrates comprising two main faces, wherein one of the faces of one of the substrates is coated with a functional coating which can have an effect on solar radiation and/or infrared radiation, and a face not coated with the functional coating of one of the substrates includes a reflective color-adjustment coating comprising at least one dielectric layer including a reflective dielectric layer with a thickness of between 2 and 100 nm, all the dielectric layers of the reflective color-adjustment coating have a thickness of less than 100 nm.

23 Claims, No Drawings

GLAZING COMPRISING A FUNCTIONAL COATING AND A COLOR ADJUSTMENT COATING

CROSS-REFERENCE TO RELATED APPLICATIONS

This application is the U.S. National Stage of PCT/FR2019/052461, filed Oct. 17, 2019, which in turn claims priority to French patent application number 1859652 filed Oct. 18, 2018. The content of these applications are incorporated herein by reference in their entireties.

The invention relates to a material comprising a transparent substrate coated with a functional coating which can have an effect on solar radiation and/or infrared radiation.

The invention also relates to glazings comprising these materials and also to the use of such materials for manufacturing thermal insulation and/or solar protection glazings.

In the continuation of the description, the term "functional" describing "functional coating" means "which can have an effect on solar radiation and/or infrared radiation".

These glazings may be intended to equip both buildings and vehicles, in particular with a view to:
  reducing the air-conditioning load and/or preventing excessive overheating, which glazings are known as "solar control" glazings, and/or
  reducing the amount of energy dissipated toward the outside, which glazings are known as "low-e" glazings.

The selectivity "S" makes it possible to evaluate the performance of these glazings. It corresponds to the ratio of the light transmission $LT_{vis}$ in the visible region of the glazing to the solar factor SF of the glazing ($S=LT_{vis}/SF$). The solar factor "SF or g" corresponds to the ratio in % of the total energy entering the space through the glazing to the incident solar energy.

Known selective glazings comprise transparent substrates coated with a functional coating comprising a stack of one or more metallic functional layers, each placed between two dielectric coatings. Such glazings make it possible to improve solar protection while retaining a high light transmission. These functional coatings are generally obtained by a sequence of depositions carried out by sputtering, optionally assisted by a magnetic field.

Conventionally, the faces of a glazing are denoted from the outside of the building and by numbering the faces of the substrates from the outside toward the inside of the passenger compartment or space equipped with it. This means that the incident sunlight passes through the faces in increasing numerical order.

Known selective glazings are in general double glazings comprising the functional coating located on face 2, i.e. on the outermost substrate of the building; on its face facing the intermediate gas-filled space.

Currently, the best performing materials have a selectivity of greater than 2 and comprise a functional coating with at least three silver-based metallic functional layers.

By way of comparison:
  a material comprising a functional coating with two silver-based layers makes it possible to obtain a selectivity of up to 1.8,
  a material comprising a functional coating with one silver-based layer makes it possible to obtain a selectivity of up to 1.2,
  a material comprising a functional coating without a silver-based layer makes it possible to obtain a selectivity up to 1.

There is currently a high demand for glazing having both a high selectivity and a shiny silver appearance in external reflection only. This is characterized by:
  a high reflection on the external side in particular a light reflection LR of greater than 25%,
  a neutral or silvery appearance with in particular values of b* in external reflection that are negative and close to 0, and
  optionally a low reflection on the interior side.

The conventional approach to obtaining both high selectivity and a particular esthetic appearance consists in developing increasingly sophisticated functional coatings.

The invention specifically relates to highly selective glazings comprising silver-based complex functional coatings.

Indeed, silver-based functional coatings generally perform better in terms of selectivity compared to other known infrared-reflecting functional coatings such as coatings comprising layers based on a conductive oxide.

On the other hand, these silver-based functional coatings are described as complex due to the number of layers constituting them, due to the nature of the materials constituting these layers and due to the adjustment of the thickness of these layers.

Adapting the colorimetry of these glazings is obtained by acting on the nature and/or the thicknesses of the layers or coatings constituting the functional coatings. However, the complexity of the functional coatings makes it difficult to jointly obtain good thermal performance and the desired esthetic appearance.

Finally, the complexity of these functional coatings also makes it difficult to maintain a constant production quality for a given functional coating. Indeed, by multiplying the number of layers and materials constituting these functional coatings, it is increasingly difficult to adapt the settings of the deposition conditions in order to obtain functional coatings of identical color originating from two batches produced on the same production site or two batches produced on two different production sites.

The aim of the invention is therefore to overcome these drawbacks by developing a glazing having both good thermal performance, while guaranteeing the desired esthetic appearance.

The applicant has developed a new solution that makes it possible to adapt the colorimetry of glazings comprising functional coatings without making these functional coatings more complex. The proposed solution consists in adding a reflective color-adjustment coating on one of the faces of a substrate of the glazing, said face not comprising the functional coating.

The invention therefore relates to a material comprising one or more transparent substrates, each substrate comprising two main faces, characterized in that:
  one of the faces of one of the substrates is coated with a functional coating which can have an effect on solar radiation and/or infrared radiation, and
  a face not coated with the functional coating of one of the substrates comprises a reflective color-adjustment coating comprising at least one dielectric layer including a reflective dielectric layer with a thickness of between 2 and 100 nm,
  all the dielectric layers of the reflective color-adjustment coating have a thickness of less than 100 nm.

The invention relates in particular to a material comprising a transparent substrate comprising two main faces, characterized in that:

one of the faces of the substrate is coated with a functional coating which can have an effect on solar radiation and/or infrared radiation, the other face of the substrate is coated with a reflective color-adjustment coating comprising at least one dielectric layer including a reflective dielectric layer with a thickness of between 2 and 100 nm, all the dielectric layers of the reflective color-adjustment coating have a thickness of less than 100 nm.

The invention relates in particular to a material comprising:

a transparent substrate comprising two main faces, of which one of the faces of the substrate is coated with a functional coating which can have an effect on solar radiation and/or infrared radiation, and an additional substrate comprising at least two main faces, characterized in that:

at least one face not coated with the functional coating of one of the substrates comprises a reflective color-adjustment coating comprising at least one dielectric layer including a reflective dielectric layer with a thickness of between 2 and 100 nm, all the dielectric layers of a reflective color-adjustment coating have a thickness of less than 100 nm.

said face is chosen from:

the other uncoated face of the substrate coated with a functional coating, one of the faces of an additional substrate.

The invention also relates to:

a glazing comprising a material according to the invention, a glazing comprising a material according to the invention mounted on a vehicle or on a building, and the process for preparing a material or a glazing according to the invention, the use of a glazing according to the invention as solar control and/or low-emissivity glazing for the construction industry or vehicles, a building, a vehicle or a device comprising a glazing according to the invention.

Surprisingly, the material according to the invention has an asymmetric light reflection. Indeed, the variation between the light reflection measured on each of the sides of the material or of the glazing is, in increasing order of preference, greater than or equal to 5%, greater than or equal to 6%, greater than or equal to 7%, greater than or equal at 8%, greater than or equal to 9%, greater than or equal to 10%, greater than or equal to 15%.

This property results from a synergy due to the combined use of the two coatings according to the invention, the color-adjustment coating and the functional coating. In fact, this property is not generally obtained when each of the coatings is used alone.

This property is particularly advantageous when the glazing is mounted so that it has a variation in light reflection (Rext-Rint) that is positive and greater than or equal to 5%.

An asymmetry in this sense is obtained, for example, by placing the color-adjustment coating on one face of a substrate located further toward the outside with respect to the face of the substrate bearing the functional coating. Such asymmetry corresponds to the selective increase in light reflection on the external side. The reflection on the interior side remains low. The resulting advantage is that of jointly obtaining:

the shiny appearance in external reflection due to the high external reflection, the maintaining of good vision from the inside of the building or the vehicle as it is not hampered by excessively high internal reflection.

The glazing according to the invention, in the form of multiple and/or laminated glazing also makes it possible to obtain the following advantageous properties:

a light transmission of less than 75%, indeed even less than 65% and/or a selectivity of greater than 1.7, greater than 1.9, indeed even greater than 2.0, and/or a reflection on the external side of greater than 26%, and/or a solar factor (SF) of less than 40%, less than 35%, less than 30%, less than 28%, indeed even less than 25% and even less than 20%.

Preferably, the reflective color-adjustment coating gives the material or the glazing comprising it a shiny silver appearance.

However, in certain particular applications, other colors are sometimes desired, in particular a neutral, blue-green or bronze appearance. The solution of the invention makes it possible to easily obtain these various colors.

The solution of the invention therefore proposes using standard or existing functional coatings, i.e. coatings that are not optimized in order to improve colorimetry, and to improve or modify their appearance by adding a reflective color-adjustment coating on another face of a substrate constituting the material or the glazing.

This solution separates the obtaining of energy performance (selectivity, emissivity, etc.), largely ensured by the functional coating, and the obtaining of the esthetic appearance and of the reflection on the external side, ensured by the color-adjustment coating.

The reflective color-adjustment coating has a less complex structure in terms of the number and thickness of layers than the functional coating. Consequently, the solution of the invention makes it possible to obtain the desired properties more easily compared to the solutions that optimize the functional coatings.

Preferably, a material or a glazing according to the invention is configured with the color-adjustment coating positioned on face 1 and the functional coating positioned on face 2.

This configuration is particularly advantageous because, in external reflection, the colored double reflections when the coatings are on two different substrates are thus avoided, but above all, the reflection is increased mainly on the external side, which is precisely one of the aims of the invention.

The material according to the invention may be in the form of monolithic, laminated and/or multiple glazing, in particular double glazing or triple glazing.

A monolithic glazing comprises a material according to the invention. Face 1 is outside the building and thus constitutes the external wall of the glazing and face 2 is inside the building and thus constitutes the internal wall of the glazing.

A multiple glazing comprises a material and at least one additional substrate, the material and the additional substrate are separated by at least one intermediate gas-filled space. The glazing provides a separation between an external space and an internal space.

A double glazing, for example, comprises 4 faces; face 1 is outside the building and thus constitutes the external wall of the glazing and face 4 is inside the building and thus constitutes the internal wall of the glazing, faces 2 and 3 being inside the double glazing.

A multiple glazing comprises a material and at least one additional substrate, the material and the additional substrate are separated by at least one lamination interlayer. A laminated glazing therefore comprises at least one structure of material/lamination interlayer/additional substrate type. In the case of a laminated glazing, all the faces of the materials and additional substrates are numbered and the faces of the lamination interlayers are not numbered. Face 1 is outside the building and thus constitutes the external wall of the glazing and face 4 is inside the building and thus constitutes the internal wall of the glazing, faces 2 and 3 being in contact with the lamination interlayer.

A laminated and multiple glazing comprises a material and at least two additional substrates corresponding to a second substrate and a third substrate, the material and the third substrate are separated by at least one intermediate gas-filled space, and
  the material and the second substrate or
  the second substrate and the third substrate,
  are separated by at least one lamination interlayer.

In the case of a multiple and/or laminated glazing, the reflective color-adjustment coating is preferably positioned on face 1 and the functional coating which can have an effect on solar radiation and/or infrared radiation is positioned on face 2 or 3.

The multiple and/or laminated glazing advantageously has a variation in light reflection (Rext-Rint), in increasing order of preference, of greater than or equal to 5%, greater than or equal to 6%, greater than or equal to 7%, greater than or equal to 8%, greater than or equal to 9%, greater than or equal to 10%, greater than or equal to 15%.

All the light characteristics described are obtained according to the principles and methods of the European standard EN 410 relating to the determination of the light and solar characteristics of the glazings used in the glass for the construction industry.

Conventionally, the refractive indices are measured at a wavelength of 550 nm.

The light characteristics are measured according to the D65 illuminant at 2° perpendicularly to the material fitted in a double glazing (unless otherwise indicated):
  LT corresponds to the light transmission in the visible region in %,
  Rext corresponds to the external light reflection in the visible region in %, with the observer on the external space side,
  Rint corresponds to the internal light reflection in the visible region in %, with the observer on the internal space side,
  a*T and b*T correspond to the colors in transmission a* and b* in the L*a*b* system,
  a*Rext and b*Rext correspond to the colors in reflection a* and b* in the L*a*b* system, the observer on the external space side,
  a*Rint and b*Rint correspond to the colors in reflection a* and b* in the L*a*b* system, the observer on the internal space side,
  Unless otherwise indicated, the colorimetric properties such as the values L*, a* and b* and all the values and ranges of values of the optical and thermal characteristics such as the selectivity, the external or internal light reflection, the light transmission are calculated with:
    materials comprising a substrate coated with a functional coating that are mounted in a double glazing,
    the double glazing has a configuration: 6-16(Δr-90%)-4, that is to say a configuration consisting of a material comprising a substrate of the ordinary soda-lime glass type of 6 mm and of another glass substrate of the soda-lime glass type of 4 mm; the two substrates are separated by an intermediate gas-filled space comprising 90% argon and 10% air with a thickness of 16 mm,
  the functional coating is preferably positioned on face 2.

An objective of the invention may be to obtain an appearance or color that is exceptionally neutral in internal reflection and in transmission and neutral or blue in external reflection.

According to the invention, neutral or blue tints in external reflection or in internal reflection are defined by:
  values of a*, in increasing order of preference, of between −5 and 1, between −4 and 0, between −3 and 0, between −2 and 0, between −1 and 0; and/or
  values of b*, in increasing order of preference, of between −10 and 0, between −5 and 0, between −3 and 0, between −2 and 0, between −1 and 0; and/or
  values of a* greater than or equal to the values of b* respectively in external reflection or in internal reflection.

According to the invention, neutral tints in transmission are defined by:
  values of a*T between −10 and 0, preferably between −5.0 and 0.0, and
  values of b*T between, in increasing order of preference, −5.0 and +10.0, between −5.0 and 5.0, between −3.0 and +3.0.

According to advantageous embodiments, the glazing of the invention, in the form of a double glazing comprising the functional coating, positioned on face 2, makes it possible in particular to achieve the following performance results:
  a solar factor g of less than or equal to 40%, less than or equal to 35%, less than or equal to 30%, less than or equal to 29%, less than or equal to 28%, less than or equal to 27%, less than or equal at 25%, less than or equal to 20%, and/or
  a light transmission, of between 25% and 70%, between 40% and 65%, or between 50% and 60% and/or
  a high selectivity, in increasing order of preference, of at least 1.7, of at least 1.8, of at least 1.9, of at least 2.0, and/or
  a variable light reflection on the external side, in particular in certain applications, of greater than or equal to 26%, and/or
  a light reflection on the internal side, of less than or equal to 25%, preferably of less than or equal to 15%.

The glazings according to the invention are fitted to a building or a vehicle.

The invention therefore also relates to:
  a glazing fitted to a vehicle or to a building, and
  a vehicle or a building comprising a glazing according to the invention.

A glazing for the construction industry generally delimits two spaces: a space described as "outside" and a space described as "inside". It is considered that the sunlight entering a building goes from the outside toward the inside.

The invention also relates:
  the process for obtaining a material or a glazing according to the invention,
  the use of a glazing according to the invention as solar control and/or low-emissivity glazing for the construction industry or vehicles.

The functional coating and/or the reflective color-adjustment coating are deposited by magnetic-field-assisted sputtering (magnetron process). According to this advantageous embodiment, all the layers of the coatings are deposited by magnetic-field-assisted sputtering.

The invention also relates to the process for obtaining a material and a glazing according to the invention, in which the layers of the coatings are deposited by magnetron sputtering.

Unless specifically stipulated, the expressions "above" and "below" do not necessarily mean that two layers and/or coatings are positioned in contact with one another. When it is specified that a layer is deposited "in contact" with another layer or with a coating, this means that there cannot be one (or more) layer(s) inserted between these two layers (or layer and coating).

In the present description, unless otherwise indicated, the expression "based on", used to describe a material or a layer with regard to what it contains, means that the fraction by weight of the constituent which it comprises is at least 50%, in particular at least 70%, preferably at least 90%.

The preferred characteristics which appear in the remainder of the description are applicable both to the material and to the glazing according to the invention and, where appropriate, to the process, to the use, to the building or to the vehicle according to the invention.

In order to determine, for a glazing comprising a known functional coating, which color-adjustment coating makes it possible to obtain the desired thermal and colorimetric properties, it is possible, by means of numerical simulations, to identify which color-adjustment coatings can be used.

According to the invention, a reflective color-adjustment coating is a coating which changes the light reflection and color of a material or glazing.

According to the invention:
the light reflection corresponds to the reflection of solar radiation in the visible part of the spectrum,
the light transmission corresponds to the transmission of solar radiation in the visible part of the spectrum,
the light absorption corresponds to the absorption of solar radiation in the visible part of the spectrum.

The reflective color-adjustment coating comprises at least one reflective dielectric layer.

A reflective dielectric layer or reflective coating is understood to mean a layer or coating which, deposited on one face of a substrate, changes the light reflection of the substrate significantly, i.e. by at least 10%, by at least 15%, by at least 20% or by at least 25%.

The variation in light reflection due to the presence of the reflective dielectric layer ($\Delta$LRI) or a reflective color-adjustment coating ($\Delta$LRc) corresponds to the variation in light reflection measured:
on an ordinary clear glass substrate of 4 to 6 mm thick on which is deposited only this reflective layer or this reflective coating, on the layer side (LRI) or coating side (RLc) and
on an ordinary clear glass substrate of 4 to 6 mm thick (RLs).

Ordinary clear glass of 4 to 6 mm thick has the following light characteristics:
a light transmission of between 89% and 91.5%,
a light reflection of between 7% and 9.5%,
a light absorption of between 0.3% and 3%.

According to the invention, the variation in light reflection due to the presence of the reflective dielectric layer ($\Delta$LRI=LRI−LRs) and/or of the reflective color-adjustment coating ($\Delta$LRc=LRc−LRs) is:
greater than 10%, greater than 15% or greater than 20%, between 10% and 65%, between 15% and 55%, between 20% and 45%, preferably between 20% and 30%.

The light reflection due to the reflective layer or the reflective color-adjustment coating measured by depositing only the reflective layer or the reflective color-adjustment coating on ordinary clear glass 4 mm to 6 mm thick, measured on the coating side, is greater than 15%, greater than 20%, greater than 25%, greater than 30%.

The variation in light transmission due to the presence of the reflective dielectric layer ($\Delta$LTI) or a reflective color-adjustment coating ($\Delta$LTc) corresponds to the variation in light transmission measured:
on an ordinary clear glass substrate of 4 mm to 6 mm thick on which is deposited only this reflective layer or this reflective coating, on the layer side (LTI) or coating side (LTc) and
on ordinary clear glass of 4 mm to 6 mm thick (LTs).

According to the invention, the variation in light transmission due to the presence of the reflective dielectric layer ($\Delta$LTI=LTI−LTs) or of the reflective color-adjustment coating ($\Delta$LTc=LTc−LTs) is:
greater than 10%, indeed even greater than 15%, or between 10% and 65%, between 15% and 55%, between 20% and 45%, preferably between 20% and 30%.

The light transmission due to the reflective layer or the reflective color-adjustment coating measured by depositing only the reflective layer or the reflective color-adjustment coating on ordinary clear glass of 4 to 6 mm thick, measured on the coating side, is greater than 75%, greater than 70%, greater than 65% or greater than 60%.

The variation in light absorption due to the presence of the reflective dielectric layer ($\Delta$LAI) or a reflective color-adjustment coating ($\Delta$LAc) corresponds to the variation in light absorption measured:
on an ordinary clear glass substrate of 4 mm to 6 mm thick on which is deposited only this reflective layer or this reflective coating, on the layer side (LAI) or coating side (LAc) and
on ordinary clear glass of 4 mm thick (LAs).

According to the invention, the variation in light absorption due to the presence of the reflective dielectric layer ($\Delta$LAI=LAI−LAs) or of the reflective color-adjustment coating ($\Delta$LAc=LAc−LAs) is:
less than 10%, less than 8%, less than 5%, less than 4%, less than 3%, less than 2%;
between 0 and 5%, between 0 and 4%, between 1% and 3%.

The color-adjustment coating may comprise other dielectric layers. These other dielectric layers may be:
reflective layers, and/or
layers having the function of protecting the substrate or the reflective layer(s), and/or,
layers having the function of adjusting the light transmission or the light absorption of the material or of the glazing.

To ensure the function of the reflective layer, it is possible to act on variations in refractive index.

The reflective layer of the reflective color-adjustment coating may therefore be a dielectric layer of refractive index (n1) having a difference in refractive index, in increasing order of preference, of greater than 0.7, greater than 0.8, greater than 0.9 with:
at least one of the dielectric layers (n1) of the color-adjustment coating or
the substrate on which the color-adjustment coating is deposited. In general, this difference in refractive index is less than 3, indeed even less than 2.

The reflective color-adjustment coating comprises at least one dielectric layer chosen from:

the layers of oxide of one or more elements chosen from titanium, silicon, zirconium, iron, chromium, cobalt, manganese, tungsten, niobium, bismuth, the layers of nitride of one or more elements chosen from silicon, zirconium and aluminum.

The refractive indices of a clear glass substrate are generally between 1.45 and 1.55.

The choice of reflective layers having high refractive index variations makes it possible to easily obtain high light reflections.

The reflective layers may therefore advantageously be chosen from high-index layers. High-index layer is understood to mean a layer, the refractive index of which is at least 2.10.

The reflective layer of the reflective color-adjustment coating is a dielectric layer, the refractive index of which is, in increasing order of preference, greater than or equal to 2.10, greater than or equal to 2.15, greater than or equal to 2.20, greater than or equal to 2.30, greater than or equal to 2.40.

The high-index layers may be chosen from:
a layer of titanium oxide $TiO_2$ (index at 500 of about 2.45),
a layer of manganese oxide MnO (index at 550 nm of about 2.16),
a layer of tungsten oxide $WO_3$ (index at 550 nm of about 2.15),
a layer of niobium oxide $Nb_2O_5$ (index at 550 nm of about 2.30),
a layer of bismuth oxide $Bi_2O_3$ (index at 550 nm of about 2.60),
a layer of zirconium nitride $Zr_3N_4$ (index at 550 nm of about 2.55),
a layer of silicon zirconium nitride (index at 550 nm between about 2.15 and 2.55).

The color-adjustment coatings may comprise one or more high-index layers which are different or of the same nature.

However, the presence of a high-index layer is not strictly necessary. The desired reflection properties according to the invention may be obtained with layers of lower refractive index. In fact, the choice of a substrate of lower refractive index or of a layer sequence of low refractive index also makes it possible to achieve the desired properties.

The reflective color-adjustment coating comprises at least one dielectric layer chosen from a layer of silicon oxide ($SiO_2$), a layer of titanium oxide ($TiO_2$), a layer of zirconium oxide ($ZrO_2$), a layer of titanium zirconium oxide (TiZrOx), a layer of iron chromium oxide (FeCrOx), a layer of iron chromium cobalt oxide (FeCrCoOx), a layer of silicon nitride ($Si_3N_4$), a layer of aluminum nitride (AlN), a layer of silicon and/or aluminum nitride, a layer of silicon zirconium nitride (SiZrN), a layer of manganese oxide (MnO), a layer of tungsten oxide ($WO_3$), a layer of niobium oxide ($Nb_2O_5$), a layer of bismuth oxide ($Bi_2O_3$), a layer of zirconium nitride ($Zr_3N_4$).

The reflective dielectric layers have a thickness of between 2 and 100 nm, preferably 10 to 80 nm, and better still 10 to 50 nm.

All the dielectric layers of a reflective color-adjustment coating have, in increasing order of preference, a thickness of less than 100 nm, less than 80 nm, less than 60 nm, less than 50 nm, less than 40 nm, less than 30 nm.

These dielectric layers may be deposited by chemical vapor deposition, liquid pyrolysis or by sputtering.

Preferably, all the layers of the reflective color-adjustment coating are deposited by sputtering.

The thickness of the reflective dielectric layer is, in increasing order of preference, from 10 to 40 nm, from 15 to 35 nm.

According to combinable embodiments, the color-adjustment coating comprises:
a layer based on titanium oxide, the thickness of this titanium oxide layer may be, in increasing order of preference, from 10 to 40 nm, from 15 to 35 nm,
at least two dielectric layers, preferably each dielectric layer has a thickness of, in increasing order of preference, from 10 to 40 nm, from 15 to 35 nm,
at least three dielectric layers, each dielectric layer has a thickness of, in increasing order of preference, from 10 to 40 nm, from 15 to 35 nm,
a layer based on silicon and/or aluminum nitride or based on silicon and/or aluminum oxide, preferably in contact with the substrate, the thickness of this layer may be, in increasing order of preference, from 10 to 40 nm, from 15 to 35 nm,
a layer based on silicon and/or aluminum nitride or based on silicon and/or aluminum oxide, preferably in contact with the substrate, the thickness of this layer may be, in increasing order of preference, from 10 to 40 nm, from 15 to 35 nm, and a layer based on titanium oxide, the thickness of this layer may be, in increasing order of preference, from 10 to 40 nm, from 15 to 35 nm,
a layer based on silicon and/or aluminum nitride or based on silicon and/or aluminum oxide, preferably in contact with the substrate, the thickness of this layer may be, in increasing order of preference, from 10 to 40 nm, from 15 to 35 nm, a layer based on titanium oxide located above a layer based on silicon and/or aluminum nitride, the thickness of this layer may be, in increasing order of preference, from 10 to 40 nm, from 15 to 35 nm, and a layer based on silicon and/or aluminum nitride or based on silicon and/or aluminum oxide, located above the titanium oxide layer, the thickness of this layer may be, in increasing order of preference, from 10 to 40 nm, from 15 to 35 nm,
a protective layer, this layer and its thickness are as defined for the protective layers of the functional coatings.

Preferably, the reflective color-adjustment coating does not include an absorbent layer. The term "absorbent layer" within the meaning of the present invention, is understood to mean a layer made of a material having an n/k ratio between 0 and 5, excluding these values, over at least 60%, preferably at least 80%, indeed even 100%, of the wavelength range of the visible region (from 380 nm to 780 nm).

The thickness of the reflective color-adjustment coating, corresponding to the sum of the physical thicknesses of all the dielectric layers of the coating, is, in increasing order of preference, from 10 to 200 nm, from 15 to 150 nm, from 20 to 100 nm, from 25 to 75 nm.

The functional coating may comprise one or more silver-based metallic functional layers, each positioned between two dielectric coatings. The functional coating may in particular comprise one, two, three or four metallic functional layers. According to these embodiments:
the functional coating comprises at least one silver-based metallic functional layer, or
the functional coating comprises at least two silver-based metallic functional layers, or
the functional coating comprises at least three silver-based metallic functional layers.

The silver-based metallic functional layers comprise at least 95.0%, preferably at least 96.5% and better still at least 98.0% by weight of silver, relative to the weight of the functional layer. A silver-based metallic functional layer preferably comprises less than 1.0% by weight of metals other than silver, relative to the weight of the silver-based metallic functional layer.

Preferably, the thicknesses of the metallic functional layers starting from the substrate increase. The increase in thickness between two successive functional layers is greater than 0.8 nm, greater than 1 nm, greater than 2 nm, greater than 3 nm or greater than 4 nm.

According to advantageous embodiments of the invention, the metallic functional layers satisfy one or more of the following conditions:

the ratio of the thickness between two successive functional layers is between 1.05 and 2.30, including these values, the thickness of each metallic functional layer is between 6 and 20 nm.

The stack may further comprise at least one blocking layer located in contact with a metallic functional layer.

The blocking layers conventionally have the role of protecting the functional layers from possible damage during the deposition of the upper antireflective coating and during a possible high-temperature heat treatment of the annealing, bending and/or tempering type.

The blocking layers are chosen from:

metallic layers based on a metal or on a metal alloy, layers of metal nitride and layers of metal oxynitride of one or more elements chosen from titanium, zinc, tin, nickel, chromium and niobium, layers of metal oxide of one or more elements chosen from titanium, nickel, chromium and niobium.

The blocking layers may in particular be layers of Ti, TiN, TiOx, Nb, NbN, Ni, NiN, Cr, CrN, NiCr, NiCrN, SnZnN. When these blocking layers are deposited in the metal, nitride or oxynitride form, these layers can undergo a partial or complete oxidation according to their thickness and the nature of the layers which frame them, for example, during the deposition of the following layer or by oxidation in contact with the underlying layer.

According to advantageous embodiments of the invention, the blocking layer or layers satisfy one or more of the following conditions:

each metallic functional layer is in contact with at least one blocking layer chosen from a blocking underlayer and a blocking overlayer, and/or each metallic functional layer is in contact with a blocking overlayer, and/or the thickness of each blocking layer is at least 0.1 nm, preferably between 0.2 and 2.0 nm.

According to the invention, the blocking layers are considered not to be part of a dielectric coating. This means that their thickness is not taken into account in the calculation of the optical or geometric thickness of the dielectric coating located in contact with them.

For the purposes of the present invention, the term "dielectric layer" should be understood as meaning that, from the viewpoint of its nature, the material is "nonmetallic", that is to say is not a metal. In the context of the invention, this term denotes a material having an n/k ratio over the entire wavelength range of the visible region (from 380 nm to 780 nm) equal to or greater than 5.

The dielectric layers of the coatings exhibit the following characteristics, alone or in combination:

they are deposited by magnetic-field-assisted sputtering, they are chosen from the oxides or nitrides of one or more elements chosen from titanium, silicon, aluminum, zirconium, tin and zinc, they have a thickness of greater than 2 nm, preferably of between 4 and 100 nm.

According to advantageous embodiments of the invention, the dielectric coatings of the functional coatings satisfy one or more of the following conditions:

the dielectric layers may be based on an oxide or nitride of one or more elements chosen from silicon, zirconium, titanium, aluminum, tin, zinc, and/or at least one dielectric coating comprises at least one dielectric layer having a barrier function, and/or each dielectric coating comprises at least one dielectric layer having a barrier function, and/or the dielectric layers having a barrier function are based on compounds of silicon and/or aluminum chosen from oxides, such as $SiO_2$ and $Al_2O_3$, silicon nitrides $Si_3N_4$ and AlN, and oxynitrides $SiO_xN_y$ and $AlO_xN_y$, based on zinc tin oxide or based on titanium oxide, the dielectric layers having a barrier function are based on compounds of silicon and/or aluminum optionally comprise at least one other element, such as aluminum, hafnium and zirconium, and/or at least one dielectric coating comprises at least one dielectric layer having a stabilizing function, and/or each dielectric coating comprises at least one dielectric layer having a stabilizing function, and/or the dielectric layers having a stabilizing function are preferably based on an oxide chosen from zinc oxide, tin oxide, zirconium oxide or a mixture of at least two thereof, and/or the dielectric layers having a stabilizing function are preferably based on crystalline oxide, in particular based on zinc oxide, optionally doped using at least one other element, such as aluminum, and/or each functional layer is above a dielectric coating, the upper layer of which is a dielectric layer having a stabilizing function, preferably based on zinc oxide, and/or below a dielectric coating, the lower layer of which is a dielectric layer having a stabilizing function, preferably based on zinc oxide.

Preferably, each dielectric coating consists solely of one or more dielectric layers. Preferably, there is thus no absorbent layer in the dielectric coatings, in order not to reduce the light transmission.

If a dielectric coating of a functional coating comprises an absorbent layer for which the refractive index at 550 nm comprises an imaginary part of the dielectric function that is non-zero (or non-negligible), for example a metallic layer, the thickness of this layer is not taken into account for the calculation of the optical thickness.

The dielectric layers can exhibit a barrier function. Dielectric layers having a barrier function (hereinafter barrier layer) is understood to mean a layer made of a material capable of forming a barrier to the diffusion of oxygen and water at high temperature, originating from the ambient atmosphere or from the transparent substrate, toward the functional layer. Such dielectric layers are chosen from the layers:

based on compounds of silicon and/or aluminum chosen from oxides such as $SiO_2$ and $Al_2O_3$, nitrides such as $Si_3N_4$ and AlN, and oxynitrides such as $SiO_xN_y$ or $AlO_xN_y$ optionally doped using at least one other element, based on zinc tin oxide, based on titanium oxide.

Preferably, each coating comprises at least one dielectric layer consisting:
of an aluminum and/or silicon nitride or oxynitride, or
of a mixed zinc tin oxide, or
of a titanium oxide.
These dielectric layers have a thickness:
of less than or equal to 40 nm, of less than or equal to 30 nm or of less than or equal to 25 nm, and/or
of greater than or equal to 5 nm, of greater than or equal to 10 nm or of greater than or equal to 15 nm.

The functional coatings of the invention may comprise dielectric layers having a stabilizing function. For the purposes of the invention, the term "stabilizing" means that the nature of the layer is selected so as to stabilize the interface between the functional layer and this layer. This stabilization results in the strengthening of the adhesion of the functional layer to the layers which frame it and, in fact, it will oppose the migration of its constituent material.

The dielectric layer or layers having a stabilizing function can be directly in contact with a functional layer or separated by a blocking layer.

Preferably, the final dielectric layer of each dielectric coating located below a functional layer is a dielectric layer having a stabilizing function. This is because it is advantageous to have a layer having a stabilizing function, for example based on zinc oxide, below a functional layer as it facilitates the adhesion and the crystallization of the silver-based functional layer and increases its quality and its stability at high temperature.

It is also advantageous to have a layer having a stabilizing function, for example based on zinc oxide, above a functional layer in order to increase the adhesion thereof and to optimally oppose the diffusion on the side of the stack opposite the substrate.

The dielectric layer or layers having a stabilizing function can thus be above and/or below at least one functional layer or each functional layer, either directly in contact therewith or separated by a blocking layer.

Advantageously, each dielectric layer having a barrier function is separated from a functional layer by at least one dielectric layer having a stabilizing function.

The zinc oxide layer can optionally be doped using at least one other element, such as aluminum. The zinc oxide is crystalline. The layer based on zinc oxide comprises, in increasing order of preference, at least 90.0%, at least 92%, at least 95%, at least 98.0%, by weight of zinc, relative to the weight of elements other than oxygen in the layer based on zinc oxide.

Preferably, the dielectric coatings of the functional coatings comprise a dielectric layer based on zinc oxide located below and directly in contact with the silver-based metallic layer.

The zinc oxide layers have, in increasing order of preference, a thickness:
of at least 3.0 nm, of at least 4.0 nm, of at least 5.0 nm, and/or
of at most 25 nm, of at most 10 nm, of at most 8.0 nm.

The functional coating may optionally comprise an upper protective layer. The upper protective layer is preferably the final layer of the stack, that is to say the layer furthest from the substrate coated with the stack. These upper protective layers are regarded as included in the final dielectric coating. These layers generally have a thickness of between 2 and 10 nm, preferably 2 and 5 nm.

This protective layer may be chosen from a layer of titanium, of zirconium, of hafnium, of zinc and/or of tin, this or these metals being in the metal, oxide or nitride form.

Advantageously, the protective layer is a layer of titanium oxide, a layer of zinc tin oxide or a layer of titanium zirconium oxide.

A particularly advantageous embodiment relates to a substrate coated with a stack, defined starting from the transparent substrate, comprising:
a first dielectric coating comprising at least one layer having a barrier function and one dielectric layer having a stabilizing function,
optionally a blocking layer,
a first functional layer,
optionally a blocking layer,
a second dielectric coating comprising at least one dielectric layer having a stabilizing function and one layer having a barrier function,
optionally a protective layer.

Another particularly advantageous embodiment relates to a substrate coated with a stack defined starting from the transparent substrate, comprising:
a first dielectric coating comprising at least one layer having a barrier function and one dielectric layer having a stabilizing function,
optionally a blocking layer,
a first functional layer,
optionally a blocking layer,
a second dielectric coating comprising at least one lower dielectric layer having a stabilizing function, one layer having a barrier function and one upper dielectric layer having a stabilizing function,
optionally a blocking layer,
a second functional layer,
optionally a blocking layer,
a third dielectric coating comprising at least one dielectric layer having a stabilizing function and one layer having a barrier function,
optionally a protective layer.

Another particularly advantageous embodiment relates to a substrate coated with a stack defined starting from the transparent substrate, comprising:
a first dielectric coating comprising at least one layer having a barrier function and one dielectric layer having a stabilizing function,
optionally a blocking layer,
a first functional layer,
optionally a blocking layer,
a second dielectric coating comprising at least one lower dielectric layer having a stabilizing function, one layer having a barrier function and one upper dielectric layer having a stabilizing function,
optionally a blocking layer,
a second functional layer,
optionally a blocking layer,
a third dielectric coating comprising at least one lower dielectric layer having a stabilizing function, one layer having a barrier function and one upper dielectric layer having a stabilizing function,
optionally a blocking layer,
a third functional layer,
optionally a blocking layer,
a fourth dielectric coating comprising at least one dielectric layer having a stabilizing function and one layer having a barrier function,
optionally a protective layer.

The transparent substrates according to the invention are preferably made of a rigid inorganic material, such as made of glass, or are organic, based on polymers (or made of polymer).

The transparent organic substrates according to the invention, which are rigid or flexible, can also be made of polymer. Examples of polymers suitable according to the invention comprise, in particular:
- polyethylene;
- polyesters, such as polyethylene terephthalate (PET), polybutylene terephthalate (PBT) or polyethylene naphthalate (PEN);
- polyacrylates, such as polymethyl methacrylate (PMMA);
- polycarbonates;
- polyurethanes;
- polyamides;
- polyimides;
- fluoropolymers, such as fluoroesters, for example ethylene-tetrafluoroethylene (ETFE), polyvinylidene fluoride (PVDF), polychlorotrifluoroethylene (PCTFE), ethylene-chlorotrifluoroethylene (ECTFE) or fluorinated ethylene-propylene copolymers (FEP);
- photocrosslinkable and/or photopolymerizable resins, such as thiolene, polyurethane, urethane-acrylate or polyester-acrylate resins; and
- polythiourethanes.

The substrate is preferably a sheet of glass or of glass-ceramic.

The substrate is preferably transparent, colorless (it is then a clear or extra-clear glass) or colored, for example blue, gray or bronze. The glass is preferably of soda-lime-silica type but it can also be a glass of borosilicate or alumino-borosilicate type.

According to a preferred embodiment, the substrate is made of glass, in particular soda-lime-silica glass, or of a polymeric organic substance.

The light transmission (LT) of the substrates, without stack, may be greater than 89%, preferably of 90%.

The substrate advantageously has at least one dimension greater than or equal to 1 m, indeed even 2 m and even 3 m. The thickness of the substrate generally varies between 0.5 mm and 19 mm, preferably between 0.7 and 9 mm, in particular between 2 and 8 mm, indeed even between 4 and 6 mm. The substrate can be flat or bent, indeed even flexible.

The material, that is to say the substrate coated with the functional coating and optionally with the color-adjustment coating, can undergo a high-temperature heat treatment, such as an annealing, for example by a flash annealing, such as a laser or flame annealing, a tempering and/or a bending. The temperature of the heat treatment is greater than 400° C., preferably greater than 450° C. and better still greater than 500° C. The substrate coated with the functional coating may thus be bent and/or tempered.

Unless otherwise mentioned, the thicknesses touched on in the present document, without other information, are real or geometrical physical thicknesses denoted Ep and are expressed in nanometers (and not optical thicknesses). The optical thickness Eo is defined as the physical thickness of the layer under consideration multiplied by its refractive index at the wavelength of 550 nm: Eo=n*Ep. As the refractive index is a dimensionless value, it may be considered that the unit of the optical thickness is that chosen for the physical thickness. Conventionally, the refractive indices are measured at a wavelength of 550 nm.

The details and advantageous characteristics of the invention emerge from the following nonlimiting examples.

EXAMPLES

I. Nature of the Layers and Coatings

Functional coatings defined below are deposited on substrates made of clear soda-lime glass with a thickness of 4 mm.

Functional metallic layers (FL) are layers of silver (Ag). The blocking layers are metallic layers made of alloy of nickel and of chromium (NiCr). Dielectric coatings of the functional coatings comprise barrier layers and stabilizing layers. The barrier layers are based on silicon nitride, doped with aluminum ($Si_3N_4$:Al) or based on mixed zinc tin oxide ($SnZnO_x$). The stabilizing layers are made of zinc oxide (ZnO). The protective layers are made of titanium oxide (TiOx).

The dielectric layers of the reflective color-adjustment coatings tested comprise:
- layers of titanium oxide,
- layers of silicon oxide,
- layers of silicon nitride.

The conditions for deposition of the layers, which were deposited by sputtering ("magnetron cathode" sputtering), are summarized in table 1.

| Tab. 1 | Target employed | Deposition pressure | Gas |
| --- | --- | --- | --- |
| $Si_3N_4$ | Si:Al at 92:8% by weight | $3.2 \times 10^{-3}$ mbar | 55% Ar/(Ar + $N_2$) |
| SiZrN | Si:Zr | $3.2 \times 10^{-3}$ mbar | 55% Ar/(Ar + $N_2$) |
| ZnO | Zn:Al at 98:2% by weight | $1.8 \times 10^{-3}$ mbar | 63% Ar/(Ar + $O_2$) |
| SnZnOx | Sn:Zn (60:40% by wt) | $1.5 \times 10^{-3}$ mbar | 39% Ar/(Ar + $O_2$) |
| TiO2 | Ti | $2 \times 10^{-3}$ mbar | 94% |
| NiCr | Ni (80 at. %):Cr (20 at. %) | 2-3 $\times 10^{-3}$ mbar | 100% Ar |
| Ag | Ag | $3 \times 10^{-3}$ mbar | 100% Ar |
| SiO2 | Si | $2 \times 10^{-3}$ mbar | 48% Ar |
| NbN | Nb | $2 \times 10^{-3}$ mbar | 60% Ar |
| SnZnN | Sn:Zn (60:40% by wt) | $1.5 \times 10^{-3}$ mbar | N2/(Ar + N2): 10%-80% |

At. = atomic

II. Reflective Color-Adjustment Coatings

Table 2 below summarizes the characteristics linked to the thicknesses of the dielectric layers constituting the reflective color-adjustment coatings. The thicknesses of the dielectric layers are physical thicknesses.

TABLE 2

| AR1 | AR2 | AR3 |
| --- | --- | --- |
| — | $TiO_2$: 2 nm | — |
| — | $SiO_2$: 13 nm | — |
| $TiO_2$: 30 nm | $TiO_2$: 28 nm | $TiO_2$: 17 nm |
| — | $Si_3N_4$: 30 nm | $Si_3N_4$: 30 nm |
| Substrate | Substrate | Substrate |

III. Functional Coatings

Table 3 lists the materials and the physical thicknesses in nanometers (unless otherwise indicated) of each layer or coating which forms the coatings as a function of their position with regard to the substrate bearing the stack (final line at the bottom of the table).

TABLE 3

|  | FC1 | FC2 | FC3 | FC4 |
| --- | --- | --- | --- | --- |
| DC: M4 | — | — | — | — |
| TiO2 | 1.5 | 2 | 2 | 1.4 |

TABLE 3-continued

|  | FC1 | FC2 | FC3 | FC4 |
|---|---|---|---|---|
| $Si_3N_4$ | 25 | 7 | 23 | — |
| SiZrN | 0 | 13 | 0 | — |
| ZnO | 6 | 7 | 8 | — |
| BL: NiCr | 1 | 0.9 | 2 | — |
| FL: Ag3 | 19 | 17.5 | 17 | — |
| BL: NiCr | 0 | 0 | 0 | — |
| DC: M3 | — | — | — | — |
| ZnO | 8 | 9 | 9 | — |
| SnZnO | 8 | 8.5 | 8 | — |
| $Si_3N_4$ | 60 | 57 | 57 | 25 |
| ZnO | 5.5 | 7 | 9 | 7 |
| BL: NiCr | 1 | 0.9 | 0.9 | 1.4 |
| FL: Ag2 | 13.5 | 12.4 | 14 | 10.2 |
| BL: NiCr | 0 | 0 | 1.5 | 2.2 |
| DC: M2 | — | — | — | — |
| ZnO | 6 | 7 | 7 | 8.4 |
| $Si_3N_4$ | 58.5 | 60 | 48 | 50 |
| ZnO | 7.1 | 6.6 | 7 | 8 |
| BL: NiCr | 0.9 | 1 | 0.9 | 1.7 |

TABLE 4

| Material | Conf. | AR Position | AR Nature | Position FC Position | Position FC Nature | LT | a*T | b*T | Rint | a*Rint | b*Rint | Rext | a*ext | b*ext | g | s | Rext-Rint |
|---|---|---|---|---|---|---|---|---|---|---|---|---|---|---|---|---|---|
| Ref. 0 | DGU | — | — | — | — | 82 | −1.6 | 0.4 | 14.9 | −0.8 | −0.5 | 14.8 | −0.9 | −0.5 | 78 | 1.1 | 0 |
| Ref. 1 | DGU | Face 1 | AR1 | — | — | 62 | −1.2 | 5.7 | 33 | −3.2 | −6.9 | 35 | −1.5 | −7.6 | 63 | 1.0 | 2 |
| Ref. 2 | DGU | Face 1 | AR2 | — | — | 62 | −0.8 | 2.3 | 33 | −3.4 | −1.2 | 35 | −2.2 | −2.2 | 62 | 1.0 | 2 |
| Ref. 3 | DGU | Face 1 | AR3 | — | — | 66 | −1.1 | 3.9 | 29.5 | −2.5 | −5.9 | 31 | −1.3 | −6.2 | 65.7 | 1.0 | 1.5 |
| Ref. 4 | DGU | — | — | Face 2 | FC1 | 62 | −5 | 1.1 | 17 | −5.2 | −9.1 | 13 | −2.7 | −9.8 | 29 | 2.1 | −4 |
| Ref. 5 | DGU | — | — | Face 2 | FC2 | 69 | −3.9 | 1.0 | 13 | −1.4 | −1.8 | 12 | −3.3 | −5.2 | 35 | 2.0 | −1 |
| Ref. 6 | DGU | — | — | Face 2 | FC3 | 47 | −8.5 | 1.0 | 18 | −11 | −10 | 16 | −5 | −9 | 21 | 2.2 | −2 |
| Ref. 7 | DGU | — | — | Face 2 | FC4 | 42 | −7 | −2 | 15 | −10 | −3 | 20 | −3.5 | −5 | 23 | 1.8 | 5 |
| Ref. 8 | Lam. | Face 2 | AR1 | — | — | 73 | −1.8 | 5.1 | 22 | −2.9 | −5.9 | 22 | −2.4 | −7.0 | 68 | 1.1 | 0 |
| Ref. 9 | Lam. | Face 2 | AR2 | — | — | 76 | −2.2 | 3.4 | 20 | −2.5 | −2.9 | 20 | −2.6 | −3.9 | 68 | 1.1 | 0 |
| Inv. D1 | DGU | Face 1 | AR2 | Face 2 | FC1 | 46 | −5 | 4.4 | 27 | −7.5 | −4.3 | 35 | −2.9 | −4.8 | 22 | 2.1 | 8 |
| Inv. D2 | DGU | Face 1 | AR2 | Face 2 | FC2 | 53 | −3.1 | 2.5 | 26 | −6.5 | −1.6 | 33 | −2.6 | −3.7 | 25 | 2.1 | 7 |
| Inv. D3 | DGU | Face 1 | AR1 | Face 2 | FC2 | 53 | −3.4 | 5.7 | 26 | −6.3 | −6.2 | 33 | −2.2 | −9.6 | 24 | 2.2 | 7 |
| Inv. D4 | DGU | Face 1 | AR3 | Face 2 | FC1 | 49 | −4.3 | 3.7 | 25 | −6.8 | −10 | 30 | −2.3 | −9.6 | 23.3 | 2.1 | 5 |
| Inv. D5 | DGU | Face 1 | AR3 | Face 2 | FC2 | 55 | −3.4 | 3.5 | 23 | −4 | −5.8 | 29 | −2.3 | −8.3 | 28 | 2.0 | 6 |
| Inv. D6 | DGU | Face 1 | AR1 | Face 2 | FC3 | 36 | −8 | 4.6 | 24 | −12.4 | −10.5 | 35 | −3.2 | −9.8 | 16 | 2.3 | 9 |
| Inv. D7 | DGU | Face 1 | AR2 | Face 2 | FC3 | 36 | −7.6 | 2 | 24 | −12.6 | −8.4 | 35 | −3.4 | −4.8 | 16 | 2.3 | 9 |
| Inv. D8 | DGU | Face 1 | AR1 | Face 2 | FC4 | 32 | −6.5 | 1.8 | 20 | −11.1 | −6 | 38 | −2.7 | −8 | 18 | 1.8 | 18 |
| Inv. D9 | DGU | Face 1 | AR2 | Face 2 | FC4 | 32 | −6.2 | −0.6 | 20 | −11.4 | −3.7 | 38 | −2.9 | −3.4 | 18 | 1.8 | 18 |
| Inv. D10 | Lam. | Face 1 | AR1 | Face 2 | FC1 | 44 | −5.1 | 12.9 | 29 | −10.4 | −8.9 | 35 | −4.1 | −11.9 | 24 | 1.8 | 6 |
| Inv. D11 | Lam. | Face 1 | AR2 | Face 2 | FC1 | 44 | −5.0 | 10.4 | 29 | −10 | −6.9 | 35 | −4.2 | −7.3 | 25 | 1.8 | 6 |

AR: Reflective color-adjustment coating; FC: functional coating.

TABLE 3-continued

|  | FC1 | FC2 | FC3 | FC4 |
|---|---|---|---|---|
| FL: Ag1 | 9 | 8.2 | 7.7 | 8.8 |
| BL: NiCr | 0.9 | 0.9 | 1.7 | 3.4 |
| DC: M1 | — | — | — | — |
| ZnO | 7 | 5.5 | 7 | 7 |
| SnZnO | 0 | 8.5 | 0 | — |
| SiZrN | 0 | 18 | 0 | — |
| $Si_3N_4$ | 35 | 13 | 46 | 26 |
| Substrate (mm) | 6 | 6 | 6 | 6 |

DC: Dielectric coating;
BL: Blocking layer;
FL: Functional layer.

IV. Configuration of the Double Glazings and Laminated Glazings

The materials comprising a transparent substrate, one of the faces of the substrate of which is coated with a functional coating, were assembled in the form of double glazing or in the form of laminated glazing.

The double glazings, hereafter "DGU" configuration, have a 6/16/4 structure: 6 mm glass/16 mm interlayer space filled with 90% argon and 10% air/4 mm glass, the functional covering being positioned on face 2. The reflective color-adjustment coating of the invention when it is present is positioned on face 1.

The laminated glazings, hereinafter "Lam" configuration, have a structure of first substrate/sheet (s)/second substrate type. The functional coating is positioned on face 2 and the reflective color-adjustment coating is positioned on face 1.

V. "Solar Control" and Colorimetry Performance

Table 4 below lists the main optical characteristics of materials in the form of multiple glazing comprising a transparent substrate, one of the faces of which is optionally coated with a functional coating and the other face of the substrate is optionally coated with a reflective color-adjustment coating.

VI. Conclusion a. Obtaining a High Reflection on the External Side

The solution of the invention makes it possible to obtain high values of external reflection, in particular all the values are greater than or equal to 29% whereas the functional coatings used alone, that is to say without a reflective color-adjustment coating, did not make it possible to obtain such values. As proof, it is possible to compare:

Ref. 4 with an external reflection of 13% and Inv. D1 and D4 with an external reflection of 35% and 30% respectively, Ref. 5 with an external reflection of 12% and Inv. D2, D3 and D5 with an external reflection of 33%, 33% and 29% respectively, Ref. 6 with an external reflection of 16% and Inv. D6 and D7 with an external reflection of 35% respectively, Ref. 7 with an external reflection of 20% and Inv. D8 and D9 with an external reflection of 38% respectively.

b. Obtaining Neutral or Blue Colors in External Reflection

The solution of the invention also makes it possible to retain neutral or blue colors in external reflection which are expressed by values of b* in external reflection that are negative and close to 0. As proof, for the examples Inv. D1 to Inv. D9, all the values of b* in external reflection are between 0 and −10. For examples D1, D2, D7 and D9, the values of b* in external reflection are between 0 and −5 whereas such values are not obtained when the functional coatings are used alone, that is to say without a reflective color-adjustment coating. Indeed, for refs. 4 to 7, the values of b* in external reflection are between −5 and −10.

The combination of obtaining a high reflection on the external side, in particular a light reflection LR greater than 26% and a neutral or silvery appearance with b* values in external reflection that are negative and close to 0 makes it possible to impart the desired shiny silver appearance.

c. Obtaining a Variation (Rext-Rint) Greater than or Equal to 5%

Another advantage of the invention is that the light reflection is mainly increased on the external reflection side and not in internal reflection. This is expressed in particular by a variation (Rext-Rint) greater than or equal to 5%. Although a high external light reflection is desirable, it is preferable for the internal reflection to remain as low as possible in order to favor vision through the glazing.

It is observed among the reference materials that only Ref. 7 has this characteristic with a variation (Rext-Rint) of 5%.

The reflective color-adjustment coatings used alone, i.e. without a functional coating, do not make it possible to obtain this asymmetry. Indeed, refs. 1, 2 and 3 all have a variation (Rext-Rint) of less than or equal to 2.

The functional coatings used alone, i.e. without color-adjustment coatings, in three 3 out of 4 cases, have an opposite asymmetry with internal reflection values greater than the external reflection values (Rint>Rext) for refs. 4, 5 and 6.

All the examples according to the invention make it possible to obtain a variation (Rext-Rint) of greater than or equal to 5%.

d. Existence of a Synergy

Inv. D1 comprises an adjustment coating AC2 and a functional coating FC1. In this example, the coatings used in Ref. 2 and Ref. 4 are combined. However, Ref. 2 and Ref. 4 respectively have a variation (Rext-Rint) of 2% and −4% whilst inv. D1 has a variation (Rext-Rint) of 8%.

The substantial gain observed clearly demonstrates the existence of a synergy linked to the combined use of the two coatings according to the invention.

This gain is even more marked when a functional coating of FC4 type is combined, which has a variation (Rext-Rint) of 5% on its own. By combining this functional coating with a reflective color-adjustment coating according to the invention, variations (Rext-Rint) that may range up 18% (Inv. 8 and Inv. 9) are obtained.

e. Laminated Glazing

Ref. 8 and Ref. 9 and the examples according to the invention 10 and 11 are examples of material in the form of laminated glazing. Refs. 8 and 9 show that when the color-adjustment coatings are located in contact with a PVB-type polymeric lamination interlayer, the external reflection is reduced. Indeed, external reflections of 22% and 20% are observed.

Inv. D10 and D11, in the form of laminated glazing, comprising a color-adjustment coating on face 1 and a functional coating on face 2 do indeed exhibit the advantageous characteristic of the invention, namely, external reflection values of greater than 30% and a variation (Rext-Rint) of greater than or equal to 5%.

The invention claimed is:

1. A glazing comprising a material comprising one or more transparent substrates comprising two main faces, wherein:
    one of the two main faces of one of the transparent substrates is coated with a functional coating comprising at least one silver metallic functional layer which has an effect on solar radiation and/or infrared radiation, and
    a main face not coated with the functional coating of one of the transparent substrates comprises a reflective color-adjustment coating comprising at least one dielectric layer including a reflective dielectric layer with a thickness of between 2 and 100 nm,
  wherein, other than said reflective dielectric layer, each of the at least one dielectric layer of the reflective color-adjustment coating has a thickness of less than 100 nm, and
  wherein the glazing has:
    a selectivity greater than 1.7, and/or
    a reflection on the external side of greater than 26%.

2. The glazing as claimed in claim 1, wherein a variation in light reflection due to the presence of the reflective dielectric layer or of the reflective color-adjustment coating corresponding to the variation in light reflection measured:
    on said one of the transparent substrates that is an ordinary clear glass substrate of 4 to 6 mm thick on which is deposited only the reflective dielectric layer or said color-adjustment reflective coating, on the layer side or coating side and
    on an ordinary clear glass substrate of 4 to 6 mm thick, is greater than 10%.

3. The glazing as claimed in claim 1, wherein a light reflection due to the reflective dielectric layer or the reflective color-adjustment coating measured by depositing only the reflective dielectric layer or the reflective color-adjustment coating on said one of the transparent substrates that is ordinary clear glass 4 mm to 6 mm thick, measured on the coating side, is greater than 15%.

4. The glazing as claimed in claim 1, wherein the at least one dielectric layer of the reflective color-adjustment coating comprises another dielectric layer and the reflective dielectric layer of the reflective color-adjustment coating is a dielectric layer with a refractive index having a difference in refractive index of greater than 0.7 with:
    the other dielectric layers of the reflective color-adjustment coating or
    the one of the transparent substrates on which the color-adjustment coating is deposited.

5. The glazing as claimed in claim 1, wherein the reflective dielectric layer of the reflective color-adjustment coating is a dielectric layer, the refractive index of which is greater than or equal to 2.10.

6. The glazing as claimed in claim 1, wherein the reflective color-adjustment coating comprises at least one dielectric layer that is:
    a layer of oxide of one or more of titanium, silicon, zirconium, iron, chromium, cobalt, manganese, tungsten, niobium, and bismuth, or
    a layer of nitride of one or more of silicon, zirconium and aluminum.

7. The glazing as claimed in claim 1, wherein the reflective color-adjustment coating comprises at least one dielectric layer selected from the group consisting of a layer of silicon oxide ($SiO_2$), a layer of titanium oxide ($TiO_2$), a layer of zirconium oxide ($ZrO_2$), a layer of titanium zirconium oxide (TiZrOx), a layer of iron chromium oxide (FeCrOx), a layer of iron chromium cobalt oxide (FeCrCoOx), a layer of silicon nitride ($Si_3N_4$), a layer of aluminum nitride (AlN), a layer of silicon and/or aluminum nitride, a layer of silicon zirconium nitride (SiZrN), a layer of manganese oxide (MnO), a layer of tungsten oxide (WO3), a layer of niobium oxide ($Nb_2O_5$), a layer of bismuth oxide ($Bi_2O_3$), and a layer of zirconium nitride ($Zr_3N_4$).

8. The glazing as claimed in claim 1, wherein a thickness of the reflective color-adjustment coating is between 10 and 200 nm.

9. The glazing as claimed in claim 1, wherein all the layers of the reflective color-adjustment coating are deposited by magnetic sputtering.

10. The dazing as claimed in claim 1, wherein a variation between the light reflection measured on each side of the material is greater than or equal to 5%.

11. The dazing as claimed in claim 1, wherein the functional coating comprises at least two silver metallic functional layers.

12. The dazing as claimed in claim 1, wherein the functional coating comprises at least three silver metallic functional layers.

13. The glazing as claimed in claim 1, wherein the one or more transparent substrates are made of glass or of a polymeric organic substance.

14. The glazing as claimed in claim 1, wherein the reflective color-adjustment coating is positioned on face 1 and the functional coating is positioned on face 2.

15. The glazing as claimed in claim 1, wherein the glazing is in the form of monolithic, laminated or multiple glazing.

16. The glazing as claimed in claim 15, wherein the glazing is a multiple glazing, the glazing comprising said material and at least one additional substrate, the material and the additional substrate are separated by at least one intermediate gas-filled space.

17. The glazing as claimed in claim 15, wherein the glazing is a laminated glazing, the glazing comprising said material and at least one additional substrate, the material and the additional substrate are separated by at least one lamination interlayer.

18. The glazing as claimed in claim 15, wherein the glazing is a multiple and laminated glazing, the glazing comprising said material and at least two additional substrates corresponding to a second substrate and a third substrate, the material and the third substrate are separated by at least one intermediate gas-filled space, and
the material and the second substrate or
the second substrate and the third substrate,
are separated by at least one lamination interlayer.

19. The glazing as claimed in claim 15, wherein the glazing is the laminated or multiple glazing and wherein the reflective color-adjustment coating is positioned on face 1 and the functional coating which has an effect on solar radiation and/or infrared radiation is positioned on face 2 or on face 3.

20. The glazing as claimed in claim 15, wherein the glazing has a variation in light reflection between Rext and Rint of greater than or equal to 5%, wherein Rext corresponds to the external light reflection in the visible region in %, with an observer on the external space side and Rint corresponds to the internal light reflection in the visible region in %, with the observer on the internal space side.

21. The glazing as claimed in claim 1, wherein the silver metallic functional layer includes less than 1.0% by weight of metals other than silver.

22. A glazing comprising a material comprising a transparent substrate comprising two main faces, wherein:
one of the two main faces of the transparent substrate is coated with a functional coating comprising at least one silver metallic functional layer which has an effect on solar radiation and/or infrared radiation,
the other main face of the transparent substrate is coated with a reflective color-adjustment coating comprising at least one dielectric layer including a reflective dielectric layer with a thickness of between 2 and 100 nm,
wherein, other than said reflective dielectric layer, each of the at least one dielectric layer of the reflective color-adjustment coating of the other transparent substrate has a thickness of less than 100 nm, and
wherein the glazing has:
a selectivity greater than 1.7, and/or
a reflection on the external side of greater than 26%.

23. A glazing comprising a material comprising:
a transparent substrate comprising two main faces, of which one of the two main faces of the substrate is coated with a functional coating comprising at least one silver metallic functional layer which has an effect on solar radiation and/or infrared radiation, and
an additional transparent substrate comprising at least two main faces,
wherein:
at least one main face not coated with the functional coating of one of the transparent substrate and additional transparent substrate comprises a reflective color-adjustment coating comprising at least one dielectric layer including a reflective dielectric layer with a thickness of between 2 and 100 nm, wherein, other than said reflective dielectric layer, each of the at least one dielectric layer of the reflective color-adjustment coating has a thickness of less than 100 nm,
said at least one main face is chosen from:
the other main face of the two main faces of the transparent substrate coated with the functional coating,
one of the two main faces of the additional transparent substrate, and wherein the glazing has:
a selectivity greater than 1.7, and/or
a reflection on the external side of greater than 26%.

* * * * *